(12) United States Patent
Steeman

(10) Patent No.: US 9,316,465 B2
(45) Date of Patent: *Apr. 19, 2016

(54) METHOD AND DEVICE FOR PRODUCING A POLYMER TAPE

(75) Inventor: Reinard Jozef Maria Steeman, Elsloo (NL)

(73) Assignee: DSM IP ASSETS B.V., Heerlen (NL)

( * ) Notice: Subject to any disclaimer, the term of this patent is extended or adjusted under 35 U.S.C. 154(b) by 627 days.

This patent is subject to a terminal disclaimer.

(21) Appl. No.: 12/732,902

(22) Filed: Mar. 26, 2010

(65) Prior Publication Data

US 2011/0076440 A1    Mar. 31, 2011

Related U.S. Application Data

(60) Provisional application No. 61/165,309, filed on Mar. 31, 2009.

(30) Foreign Application Priority Data

Mar. 31, 2009    (EP) .................................... 09156932

(51) Int. Cl.
*B29C 55/06* (2006.01)
*B29C 55/18* (2006.01)
*B29C 43/22* (2006.01)
*F41H 5/04* (2006.01)
(Continued)

(52) U.S. Cl.
CPC .............. *F41H 5/0485* (2013.01); *B29C 43/22* (2013.01); *B29C 55/06* (2013.01); *B29C 55/065* (2013.01); *B29C 55/18* (2013.01); *B29C 43/006* (2013.01); *B29C 43/228* (2013.01); *B29C 43/24* (2013.01); *B29C 43/26* (2013.01); *B29C 43/46* (2013.01); *B29C 43/48* (2013.01); *B29C 55/005* (2013.01); *B29C 65/7891* (2013.01); *B29C 2043/468* (2013.01); *B29K 2023/0675* (2013.01); *B29K 2023/0683* (2013.01); *Y10T 428/24* (2015.01)

(58) Field of Classification Search
None
See application file for complete search history.

(56) References Cited

U.S. PATENT DOCUMENTS 4,405,775 A    9/1983    Hashimoto
4,413,110 A *  11/1983    Kavesh et al. ............. 526/348.1
(Continued)

FOREIGN PATENT DOCUMENTS

DE            42 11 779         10/1993
DE     10 2007 017 621          10/2008
(Continued)

OTHER PUBLICATIONS

U.S. Appl. No. 13/256,327, filed Dec. 5, 2011.

*Primary Examiner* — Jeffrey Wollschlager
(74) *Attorney, Agent, or Firm* — Nixon & Vanderhye P.C.

(57) ABSTRACT

The invention relates to a method for producing a highly oriented, high molecular weight polymer tape. The method comprises forming and compression-molding a polymer powder bed at a temperature below the melting point of the polymer to form a sheet; at a temperature below the melting point of the polymer, rolling and stretching the sheet in a calendar unit to form a partially oriented polymer web; at a temperature below the melting point of the polymer, drawing the partially oriented polymer web in a drawing unit; and, optionally repeating step c) to form a more fully oriented non-fibrous high molecular weight polymer tape, the method being discontinuous in that the ingoing line speed of one of the method steps b) to d) differs from the outgoing line speed of the preceding method step.

28 Claims, 2 Drawing Sheets

(51) Int. Cl.
 *B29C 43/26* (2006.01)
 *B29C 43/00* (2006.01)
 *B29C 43/24* (2006.01)
 *B29C 55/00* (2006.01)
 *B29C 43/46* (2006.01)
 *B29C 65/78* (2006.01)
 *B29C 43/48* (2006.01)
 *B29K 23/00* (2006.01)

(56) References Cited

U.S. PATENT DOCUMENTS

| | | | |
|---|---|---|---|
| 4,435,883 A | | 3/1984 | Muszynski |
| 5,326,507 A | * | 7/1994 | Starzewski ............ 264/1.35 |
| 5,342,567 A | | 8/1994 | Chen et al. |
| 5,479,952 A | | 1/1996 | Zachariades et al. |
| 5,693,708 A | | 12/1997 | Iwanami et al. |
| 5,695,698 A | | 12/1997 | Ajji et al. |
| 5,702,657 A | | 12/1997 | Yoshida et al. |
| 5,741,451 A | * | 4/1998 | Dunbar et al. ............ 264/103 |
| 6,017,480 A | | 1/2000 | Yoshida et al. |
| 6,589,463 B1 | | 7/2003 | Vogt et al. |
| 7,470,459 B1 | | 12/2008 | Weedon et al. |
| 7,976,930 B2 | | 7/2011 | Weedon et al. |
| 2008/0251960 A1 | * | 10/2008 | Harding et al. ............ 264/119 |
| 2008/0318016 A1 | | 12/2008 | Weedon et al. |
| 2010/0151755 A1 | * | 6/2010 | Bruning et al. ............ 442/1 |
| 2012/0071621 A1 | | 3/2012 | Steeman |

FOREIGN PATENT DOCUMENTS

| | | |
|---|---|---|
| EP | 0 030 648 | 6/1981 |
| EP | 1 329 303 | 7/2003 |
| EP | 1 752 276 | 2/2007 |
| GB | 1 275 290 | 5/1972 |
| WO | WO2007122010 | * 11/2007 |
| WO | 2008/127562 | 10/2008 |

* cited by examiner

METHOD AND DEVICE FOR PRODUCING A POLYMER TAPE

This application claims priority to EP Application No. 09156932.7 filed 31 Mar. 2009; and claims the benefit of U.S. Provisional Application No. 61/165,309 filed 31 Mar. 2009, the entire contents of each of which are hereby incorporated by reference.

The invention relates to a method and a device for producing an oriented, preferably a highly oriented non-fibrous polymer tape. The invention also relates to an oriented, preferably highly oriented polymer tape, a material sheet comprising the polymer tape, and to an article comprising the material sheet, in particular to a ballistic resistant article comprising the material sheet.

Highly oriented polymer tapes may be used advantageously to manufacture material sheets for ballistic applications. WO 2008/127562 which is incorporated fully by reference herein describes a continuous method for producing a highly oriented non-fibrous, high molecular weight polyethylene tape. The disclosed method comprises forming and compression-moulding a polyethylene powder bed in a double band press, rolling and stretching the thus formed sheet in a double calendar unit to form a partially oriented polyethylene web, and drawing the partially oriented polyethylene web in one or more drawing units. The disclosed method steps are carried out continuously.

By the term "continuous" is meant that the ingoing line speed of a method step is substantially the same as the outgoing line speed of the preceding method step. That is, by continuous is meant that although in a method step the ingoing line speed of said method step may be different than the outgoing line speed of said same method step, between two adjacent method steps the ratio of the ingoing line speed of a method step to the preceding method step is substantially one. Line speed is a term commonly used in the art and represents the speed with which an article is fed, i.e. ingoing line speed, or discharged, i.e. outgoing line speed, in a method step.

The disclosed continuous method of WO 2008/127562 seems to be efficient since a highly oriented polyethylene tape is produced in basically one operation, without the need for temporary storage of intermediate products for instance.

Other continuous methods for the manufacturing of polymer tapes are known for example from US 2008/0251960; EP 1 329 303; EP 1 752 276; U.S. Pat. No. 5,693,708; U.S. Pat. No. 6,589,463; GB 1 275 290 and EP 0 030 548. These publications either specifically mention that the process disclosed therein is continuous, i.e. the ingoing line speed of a method step is substantially the same as the outgoing line speed of the previous method step, either they are silent with respect to the ingoing and the outgoing line speeds of an individual method step or of two adjacent method steps.

The object of the present invention may be to provide a novel method for the preparation of oriented polymer tapes and more in particular of highly oriented polymer tapes. Another aim of the present invention may be to provide an improved method for the preparation of oriented and in particular highly oriented polymer tapes, said method being improved in that it may have an even higher efficiency and/or flexibility in choosing method parameters than known methods. Yet a further aim of the present invention may be to provide an oriented and in particular a highly oriented polymer tape and a material sheet comprising said polymeric tape which were never been provided hitherto. Yet a further aim of the present invention may be to provide polymer tapes that are oriented or highly oriented and material sheets comprising thereof that can be produced easily and have at least similar properties, in particular similar antiballistic properties, as the known tapes and material sheets containing tapes or other commercially available materials based on e.g. highly oriented polymers or polymeric fibers.

The present invention provides a method for producing an oriented non-fibrous polymer tape, the method comprising a) forming a non-fibrous polymeric sheet; b) rolling and stretching said sheet to form a partially oriented polymer web; c) drawing the partially oriented polymer web to form an oriented non-fibrous polymer tape, wherein the method is discontinuous in that the ingoing line speed of at least one method step, in particular the ingoing line speed of the method steps b) or c), differs from the outgoing line speed of the preceding method step.

Preferably, the polymer is a high molecular weight polymer.

Step(s) b) and/or c) in the method of the invention may be optionally repeated in order to achieve a more oriented, i.e. a highly oriented non-fibrous polymer tape. The invention therefore relates to a method for producing a highly oriented non-fibrous polymer tape, the method comprising a) forming a non-fibrous polymeric sheet; b) rolling and stretching said sheet to form a partially oriented polymer web; c) drawing the partially oriented polymer web to form an oriented non-fibrous polymer tape; d) repeating step(s) b) and/or c) at least one time to form a more oriented non-fibrous polymer tape, the method being discontinuous in that the ingoing line speed of at least one method step differs from the outgoing line speed of the preceding method step. Preferably, said polymer is a high molecular weight polymer.

Preferably, the method of the present invention is a method for producing a highly oriented non-fibrous polymer tape, the polymer comprised by said tape being preferably a high molecular weight polymer, the method comprising a) forming and compressing a polymer powder bed at a temperature below the melting point of the polymer to form a non-fibrous polymeric sheet; b) at a temperature below the melting point of the polymer, rolling and stretching said sheet in a calendar unit to form a partially oriented polymer web; c) at a temperature below the melting point of the polymer, drawing the partially oriented polymer web in a drawing unit to form an oriented non-fibrous polymer tape; and, optionally, d) repeating step c) to form a more oriented non-fibrous polymer tape, the method being discontinuous in that the ingoing line speed of at least one of the method steps b) or c) or if step d) is present the ingoing line speed of at least one of the method steps b) to d) differs from the outgoing line speed of the preceding method step.

Surprisingly, it has been found that the discontinuous method of the present invention may allow producing polymer tapes more economically than the known methods of producing polymer tapes. In particular, it was observed that the method of the invention is more economical than known methods and allows for the production of drawn tapes, i.e. tapes which were drawn in order to produce oriented or highly oriented tapes, with at least similar properties as those of the known polymer tapes for the same total draw ratio.

It was also observed that the invented discontinuous method is flexible in that it may allow tailoring production parameters for each method step. It may be for instance possible to select two distinct ingoing line speeds for the drawing steps of an embodiment of the method of the invention which comprises two separate drawing steps. It may also be possible to select an ingoing line speed for the drawing step, e.g. step c) in the method of the invention, that differs from the outgoing line speed of the step wherein rolling and stretching takes place, e.g. the step b) in the method of the invention wherein rolling and stretching the non-fibrous polymeric sheet in e.g. a first calendar unit to form a partially oriented polymer web takes place.

A further advantage of the discontinuous method of the invention may be that less breakages of the tape during its production may occur. A yet further advantage of the proposed discontinuous method may be that quality control of e.g. the manufactured products can be performed more frequently, for instance between method steps.

A particularly preferred embodiment of the method according to the invention is characterized in that the ingoing line speed of at least one of the method steps, e.g. the method steps b) to d), is selected lower than the outgoing line speed of the preceding method step. Preferably, the ingoing line speed of at least one of the method steps, e.g. the method steps b) to d), is selected lower than the outgoing line speed of the preceding method step with the proviso that step a) is directly followed by step b) and that the outgoing line speed of step a) is substantially the same with the ingoing line speed of step b). Such preferred embodiment allows to draw e.g. in drawing step c) of the method of the invention, a partly oriented polymer web for instance at lower ingoing line speeds than it is possible in known methods. This may allow the use of substantially shorter heating zones, e.g. shorter ovens, in the drawing unit(s) for the same residence time. Since in the method of the invention, heating and/or drawing zones will generally be shorter than in the known methods, the partly oriented polymer web to be drawn needs less support, e.g. in order to prevent sagging of said web. It was also observed that the same is applicable for oriented or highly oriented tapes. It was observed that said web or said tape indeed will show less deformation under the action of gravity forces even when heated at high temperatures, e.g. close to the melting point of the polymer and therefore will be less prone to contact the walls of the heating and/or drawing zone. Contact of said web or said tape with e.g. walls preferably is to be avoided since such contact may damage the web or the tape and may result in lesser properties thereof or may result in a lower drawability thereof.

Another preferred embodiment of the method according to the invention is characterized in that it further includes an additional method step e) of rolling and stretching the partially oriented polymer web of step b) in an e.g. second calendar unit to form a more fully oriented polymer web. By more fully oriented web is herein understood that a web exiting step e) has a better orientation than a web exiting step b) for example more polymeric chains in the web exiting step e) are oriented, or longer portions of said chains are oriented than in the web exiting step b). An advantage hereof may be that for a given draw ratio of a polymer tape, thickness and width can be independently controlled. A further advantage may be that a restart of the invented process after interruption is much easier than restarting a process according to the state of the art.

The invented discontinuous method may also allow for the simultaneous drawing of more than one polymer web. This may allow maintaining the same throughput (mass per unit of time) even at a reduced line speed. It was observed that a reduced speed is beneficial in that it can be controlled easier than a large speed and moreover it is safer. A considerable advantage is hereby gained, in particular when the ingoing line speed of a method step is smaller than the outgoing line speed of the preceding step, since the same amount of material can be produced within a certain production time frame, while using substantially less space in terms of oven length for instance, or alternatively less complex oven layout may be chosen by refraining from use of multi-pass ovens. Furthermore temperature control is also more accurate in the smaller or less complex ovens that may be used in the process according to the invention.

In another embodiment of the invention, the ingoing line speed of a method step, e.g. method steps b) to e), is higher than the outgoing line speed of the preceding step. The advantage thereof is that a better control of the force that is exerted on the non-fibrous polymeric sheet, polymeric web or tape during the method of the invention is achieved which in turn allows a better control of the thickness of said non-fibrous polymeric sheet, polymeric web or tape. Preferably, this embodiment also comprises a further winding step wherein after exiting a method step, the non-fibrous polymeric sheet, polymeric web and/or tape is/are wound, e.g. on a bobbin, at a winding speed which is preferably substantially the same with the outgoing line speed of said method step. After said winding step, the wound non-fibrous polymeric sheet, polymeric web and/or tape is/are fed to the next method step with a feeding speed which is preferably substantially the same with the ingoing line speed of said next method step. The advantage thereof is that the process of the invention has an increased output.

The invention also relates to an oriented or highly oriented polymeric tape obtainable by the process of the invention. It was observed that the tapes of the invention when used to construct ballistic resistant articles, may impart these articles with properties, in particular ballistic properties, never achieved hitherto.

According to the invention, the oriented or highly oriented polymeric tapes, or simply referred to herein as tapes, are tapes of a drawn polymer; more preferably, said tapes are unidirectional tapes of a drawn polymer. With unidirectional tapes is meant in the context of the invention tapes that show a preferred orientation of the polymer chains in one direction, i.e. in the direction of drawing. Tapes of a drawn polymer may be produced by drawing said tapes, preferably by uniaxial drawing, if unidirectional tapes are to be produced and which will exhibit anisotropic mechanical properties, i.e. tensile strength in one direction, the direction of drawing, is preferably at least 3 times higher than a direction perpendicular thereto. By oriented tape is herein understood a tape having a crystallinity as measured by DSC of above 30%, and more preferably above 50%. By highly-oriented tape is herein understood a tape having a crystallinity as measured by DSC of above 75%, and more preferably above 90%. The crystallinity, also referred in the art as the degree of crystallinity, of a tape can be increased for example by drawing the tape to a larger extent. By crystallinity is herein understood the fraction of the polymeric chains comprised by a polymeric tape, said chains being ordered to form a crystal-like structure.

As used herein and in the accompanying claims, the term "tape" may also mean a non-fibrous film, preferably a flexible non-fibrous film (i.e. a film containing no fibrous media such as fibers, filaments, staple fibers, yarns and the like) having a preferably indefinite length and a thickness that is negligible compared to its width. Thus, a tape may be seen as a thin piece or portion of a film whose width greatly exceeds its thickness and whose length greatly exceeds its width. It was observed that the physical structure, e.g. ductility and flexibility, and/or the appearance of a tape changes during the steps of the method of the present invention in a different fashion than during the steps of the methods of the prior art as known from the above mentioned documents. In particular the ductility and/or the breakability of the tape during various steps of the method of the invention showed an improvement.

A preferred embodiment of the tape according to the invention is characterized in that the polymer used in the method of the invention to manufacture said tape is selected from the group consisting of polyolefins, polyesters, polyvinyl alcohols, polyacrylonitriles, polyamides, liquid crystalline polymers and ladder-like polymers, such as polybenzimidazole or polybenzoxazole, especially poly(1,4-phenylene-2,6-benzobisoxazole), or poly(2,6-diimidazo[4,5-b-4',5'-e]pyridinylene-1,4-(2,5-dihydroxy)phenylene). Unidirectional tapes from these polymers are preferably highly oriented, i.e. having a crystallinity as measured by DSC of above 75%, and more preferably above 90%, by uniaxially drawing the formed material, for instance films, at a suitable temperature.

An even more preferred embodiment of the tape according to the invention is characterized in that the polymer used in the method of the invention to manufacture said tape is selected from the group consisting of polyolefins, polyesters, polyvinyl alcohols, polyacrylonitriles, and polyamides. Material sheets comprising these tapes can be very well consolidated, and provide improved antiballistic properties. An even more preferred embodiment of the tape according to the invention is characterized in that the polymer used in the method of the invention to manufacture said tape is a polyolefin, preferably of high or ultra high molecular weight. Such molecular weight—expressed as a viscosity-average molecular weight, determined according to a method as described herein below—preferably has a molecular weight of more than 250000, more preferably of more than 400000, even more preferably of more than 600000, and most preferably of more than 800000. In a preferred embodiment hereof the tapes of the invention comprise high or ultra high molecular weight polyethylene (HMWPE or UHMWPE). The polyethylene may be linear or branched, although preferably linear polyethylene is used. Linear polyethylene is herein understood to mean polyethylene with less than 1 side chain per 100 carbon atoms, and preferably with less than 1 side chain per 300 carbon atoms; a side chain or branch generally containing at most 3 carbon atoms. Side chains may suitably be measured by FTIR on a 2 mm thick compression moulded film, as mentioned in e.g. EP 0269151, which is incorporated fully by reference herein. The linear polyethylene may further contain up to 5 mol % of one or more other alkenes that are copolymerisable therewith, such as propene, butene, pentene, 4-methylpentene, octene. Preferably, the polyethylene is of high molar mass with an intrinsic viscosity (IV, as determined on solutions in decalin at 135° C.) of at least 4 dl/g; more preferably of at least 8 dl/g, most preferably of at least 10 dl/g. Such polyethylene is also referred to as ultra high molecular weight polyethylene. Intrinsic viscosity is a measure for molecular weight that can more easily be determined than actual molar mass parameters like Mn and Mw. A polyethylene tape of this type yields particularly good antiballistic properties. Such ultrahigh molecular weight polyethylene needs to be drawable in the solid state, e.g. by having limited to no entanglements, in the art often referred to as 'low entangled' or '(semi-)virgin'. Suitable polymers are described in e.g. patent EP0624168A1, which is hereby fully incorporated by reference herein.

The method according to the invention compresses and/or deforms a polymer powder bed preferably at a temperature below the melting point of the polymer to form a non-fibrous polymeric sheet with enough integrity that it that can be drawn. Such drawing is preferably performed at a temperature below the melting point of the polymer in a drawing unit, and this drawing is optionally repeated a number of times. The melting point of the polymer, also called melting temperature may be determined by DSC as detailed below.

In a preferred embodiment of the method of the invention, step a) comprises feeding the polymeric powder bed between a combination of endless belts and compression-moulding the polymeric powder bed between pressuring means provided preferably at a temperature below the melting point of the polymeric powder, conveying the resultant compression-moulded polymer between calendar rolls and preferably drawing the compression-moulded polymer, whereby the method is discontinuous. Alternatively feeding the polymeric powder bed between a combination of endless belts may be done through a carrier means, an example thereof including a conveyor belt.

If desired, prior to feeding and compression-moulding the polymer powder, the polymer powder may be mixed with a suitable liquid organic compound having a boiling point higher than the melting point of said polymer, to achieve an improved compaction of said polymer powder. Compression moulding is preferably carried out by temporarily retaining the polymer powder between the endless belts while conveying. Pressing means and/or rollers may be provided in connection with the endless belts to compress the polymeric powder.

Drawing, preferably uniaxial drawing, of the produced films or tapes may be carried out by means known in the art. Such means comprise extrusion stretching and tensile stretching on suitable drawing units. To attain increased mechanical strength and stiffness, drawing may be carried out in multiple steps. In case of the preferred ultra high molecular weight polyethylene tapes or films, drawing is typically carried out uniaxially in a number of drawing steps. The first drawing step may for instance comprise drawing to a stretch factor of 3. By multiple drawing at increasing temperatures, stretch factors of about 50 and more may be reached, whereby the process is run under such conditions, e.g. as temperature, that no melting of the tape occurs. This results in the high strength tapes of the invention, whereby for tapes of ultra high molecular weight polyethylene, strengths of 1.5 GPa and more may be obtained.

The width of the tapes of the invention and in particular the width of the unidirectional tapes, is only limited by the width of the film or the width of the device through which they are produced. The width of the tapes preferably is more than 2 mm, preferably more than 5 mm, more preferably more than 10 mm, even more preferably more than 20 mm. Most preferably the width of the tapes is more than 40 mm. It was observed that wider tapes perform better when woven into material sheets and furthermore, material sheets comprising wider tapes have further improved properties, in particular antiballistic properties, especially when the width of the tapes is more than 40 mm. Furthermore such wider tapes allow for faster processability into a material sheet. By material sheet is herein understood a sheet comprising the tapes of the invention, the term "material sheet" being distinct from the term "non-fibrous polymeric sheet" used hereinbefore and after which means an intermediate product in a sheet form produced by carrying out step a) of the method of the invention.

In principle there is no restriction to the maximum width of the tape of the invention. In practice a practical maximum width could be at most 500 mm The areal density of the tapes of the invention can be varied over a large range, for instance between 5 and 200 $g/m^2$, e.g. by proper choice of the drawing conditions. The preferred areal density is between 8 and 120 $g/m^2$, more preferred between 10 and 80 $g/m^2$, even more preferred between 12 and 60 $g/m^2$, and most preferred between 12 and 30 $g/m^2$. In particular for polyethylene tapes and more in particular for UHMWPE tapes, the areal density of the tapes is preferably between 10 and 80 $g/m^2$, even more preferred between 30 and 50 $g/m^2$, The areal density of a tape can be determined by weighing a conveniently cut surface from the tape. It was observed that material sheets made of such tapes have improved antiballistic performance.

The thickness of the tapes of the invention, in particular the unidirectional tapes, can in principle be selected within wide ranges. Preferably however, the thickness of the tapes does not exceed 120 µm, more preferably does not exceed 80 µm, even more preferably does not exceed 50 µm, and most preferably does not exceed 30 µm. In particular for polyethylene tapes and more in particular for UHMWPE tapes, the thickness thereof is preferably between 10 µm and 100 µm, more preferably between 30 µm and 60 µm. The skilled person knows how to determine the thickness of the tape, e.g. with a micrometer, alternatively this may be calculated by dividing the areal density by the specific gravity of the polymer.

The strength of the tapes of the invention, in particular the tapes in the material sheet, largely depends on the polymer from which they are produced, and on their (uniaxial) drawing or draw ratio but is, according to the invention at least 0.75 GPa, preferably at least 1.0 GPa, more preferably at least 1.5 GPa, even more preferably at least 2.0 GPa and most preferably at least 2.5 GPa.

Particularly good results are obtained when drawn tapes, preferably unidirectional tapes according to the invention are used in manufacturing a multilayered material sheet. Consequently the invention also relates to a multilayered material sheet, comprising polymeric tapes produced according to the method of the invention. In a first embodiment, the multilayered material sheet comprises a consolidated stack of monolayers of drawn polymer tape, whereby the draw direction of the tape of two subsequent monolayers in the stack differs, and whereby a monolayer is built up of a plurality of adjacently positioned polymeric tapes according to the invention. In a monolayer, the polymeric tapes are preferably uniaxially drawn and positioned parallel to each other, thereby forming a unidirectional monolayer. The multilayered material sheet according to the invention preferably comprises at least 2 unidirectional monolayers, preferably at least 4 unidirectional monolayers, more preferably at least 6 unidirectional monolayers, even more preferably at least 8 unidirectional monolayers and most preferably at least 10 unidirectional monolayers. Increasing the number of unidirectional monolayers in the multilayer material sheet of the invention allows the manufacture of articles with large thickness from these material sheets, for instance antiballistic plates.

In another embodiment of the multilayered material sheet according to the invention, the sheet is obtained by weaving a plurality of tapes. The polymeric tape product may be used in the form of one woven fabric as produced. However, it is also possible to provide a multilayered material sheet by stacking a plurality of polymeric tape products according to the invention. Such a multilayered polymeric tape product preferably comprises at least 2 woven fabrics, preferably at least 4 woven fabrics, more preferably at least 6 woven fabrics, even more preferably at least 8 woven fabrics, and most preferably at least 10 woven fabrics. Increasing the number of woven fabrics in the multilayer polymeric tape product of the invention allows the manufacture of articles with large thickness from these polymeric tape products, for instance antiballistic plates.

The multilayered material sheet according to the invention is particularly useful in manufacturing ballistic resistant articles, such as vests or armoured plates. Ballistic resistant articles protect against ballistic threat of projectiles of several kinds including against armor piercing, so-called AP bullets and hard particles such as e.g. fragments and shrapnel. The multilayered material sheet according to the invention is most suitable for use in hard ballistics, such as e.g. panels, for use in vehicles for land/air or sea, or panels for inserts in bullet resistant vests. The material sheet according to this invention may suitably be used as a so-called back face behind a ceramic or metal strike face. The invention therefore also relates to the enumerated ballistic resistant articles comprising the material sheet and tapes of the invention. Besides ballistic resistance, useful properties also include heat stability, shelf-life, deformation resistance, bonding capacity to other material sheets and formability.

The invention also relates to a device for producing an oriented or a highly oriented non-fibrous, polymer tape, wherein the polymer comprised by said tape is preferably a high molecular weight polymer the device comprising:

a) a forming unit having an upper and lower rotating belt, between which particles of polymer, preferably a high molecular weight polyolefin and most preferably a solid state drawable polyethylene, can be fed, and a compressing unit for compressing the particles to form a non-fibrous polymer sheet;

b) a calendar unit and heater for rolling and stretching the sheet and forming at least a partially oriented polymer web; optionally a second calendar unit and heating means for further rolling and stretching the sheet and forming a more oriented polymer web c) a drawing unit and heater for drawing the at least partially oriented polymer web and form a more oriented non-fibrous polymer tape; and d) at least one additional drawing unit and heater, whereby the device is provided with at least one take-up and/or feed station between at least two of the units a) to d) and optionally a third and more subsequent drawing units.

In a preferred embodiment of the device of the invention, said device further comprises a1) a heating unit for heating up the tapes at a temperature of preferably below the melting point of the polymer, said heating being carried out before feeding the non-fibrous polymeric sheet to the calendar unit at b).

The device is particularly suitable for carrying out the method in accordance with the invention. The at least one take-up and/or feed stations are provided to carry out the method discontinuously as it is essential to the invention. The at least one take-up station is adapted for collecting up a product e.g. the polymer web produced in a preceding step of the method. The at least one feed station is adapted for feeding the collected product, e.g. the collected polymer web produced in a preceding step of the method, and feed said product, e.g. the web, to a next step in the method at a line speed that differs from the outgoing line speed of the previous step. A take-up station and/or a feed station may be e.g. in the form of a winder unit or a sheet feeder unit.

In a preferred embodiment of the device, it further comprises at least one additional second calendar unit or second means for rolling and stretching the polymer web. The advantages of this embodiment have already been elucidated in the context of the description of the invented method and will not be repeated here.

The invention is now further explained by means of the attached figures, and by the following Example, without being limited thereto.

Figure 1:
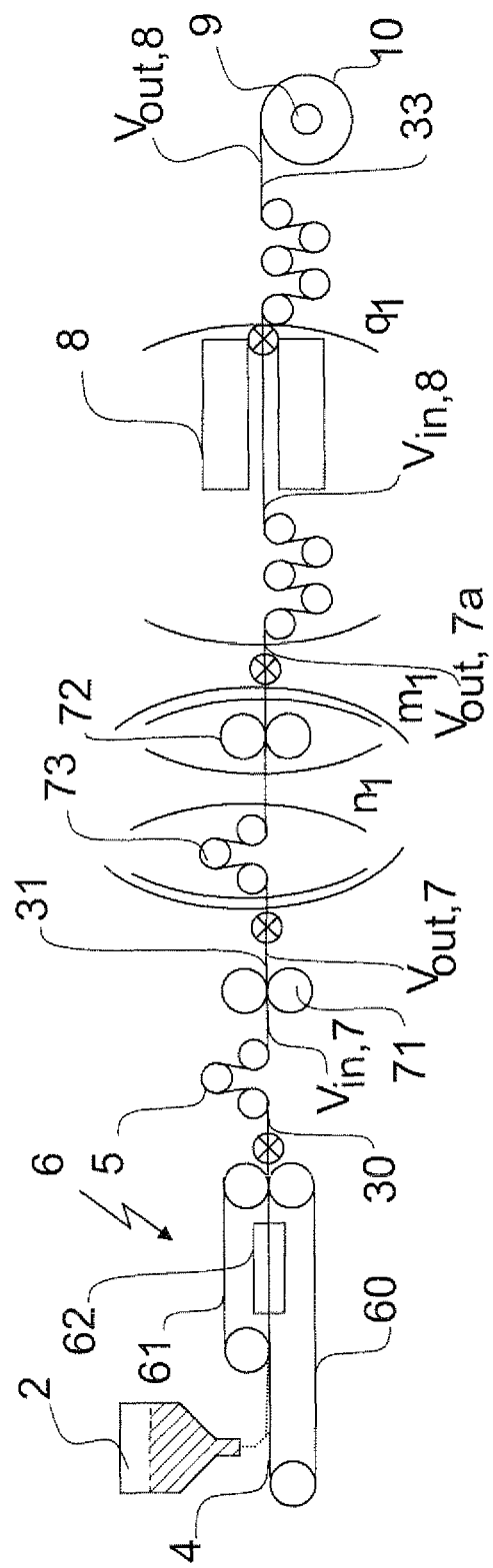
FIG. 1 is a schematic representation of a first part of a device for producing a polymer tape according to the present invention.

With reference to FIG. 1 there is shown a multi-calendar device for producing a polymer tape, in particular a high molecular weight polymer tape and more in particular an ultra high molecular weight polyethylene tape according to the present invention. The device comprises a raw material hopper 2 for introducing a polymeric powder or particulates, in particular a high molecular weight polymer powder or particulates, exhibiting preferably a high crystallinity, e.g. of at least 77% as calculated from DSC data and preferably a high specific heat of fusion, preferably of at least 200 J/g as measured by DSC to a conveying belt 4 that is conveying from left to right in the figure. Powders having such properties can be manufactured according to the previously cited EP0624168A1 fully incorporated herein by reference. A compression force is applied to the polymer powder at forming station 6 while holding the polymer powder at a temperature lower than the melting point of the polymer. The embodiment shown in FIG. 1 depicts a forming station 6 including an upper and lower rotating belt 60, 61, and compressing unit 62, e.g. in the form of pressure plates or an oil cushion. The compression force from the compressing unit 62 forms the polymer powder into a handleable non-fibrous polymer sheet 30 and removes air from said sheet 30 e.g. to improve heat transfer at subsequent stages of the method. Said sheet 30 is then preheated by pre heater rolls 5 or e.g. an oven to a temperature below the melting point of the polymer and/or infrared (IR) heaters, and then conveyed through a calendar (or rolling) station 71. Optionally at least one additional calendar station 72, as well as a preheater unit 73 may be included. Calendaring is accomplished by the application of pressure with temperatures preferably lower than the melting point of the polymer. The calendar station 71 calendars and elongates the polymer sheet 30, such that it becomes at least partly oriented. The ingoing line speed at calendar station 71 is typically, however not limited to, between 0.5 and 2 meters per minute. Resulting from compressing, calendaring and drawing of the polymer molecules in the first calendar station 71, the calendared non-fibrous polymeric sheet 31 exits the first calendar station 71 in a partially oriented state said partially oriented sheet 31 being referred herein interchangeably as a polymeric web or a polymer web. The partially oriented sheet, i.e. the polymeric web, 31 is optionally preheated by preheating unit 73 to a temperature preferably below the melting point of the polymer and then optionally enters second calendar station 72 in which the polymer web 31 is further calendared. In FIG. 1 n1 is an integer of at least 0, m1 is an integer of at least 0 and q1 is an integer of at least 1; furthermore ⊗ denotes a potential take up unit. In the event of more than one calendar station, the rolling ratio between such station(s) can be varied at will, with each station performing some of the drawing. The further oriented polymer web 32 exits the last calendar station typically at a line speed of between 2 and 20 meters per minute, preferably at a line speed of between 2 and 10 meters per minute.

As shown in FIG. 1, after the last rolling station, the oriented polymer web 32 enters a first stage drawing unit 8, in which said web is drawn at a ratio of between 2 and 4. At the exit of the first stage drawing unit 8, the polymer web 33 has typically undergone a total draw ratio of between 5 and 20 and is referred herein as an oriented non-fibrous tape. The outgoing line speed at the first stage drawing unit 8 is preferably between 5 and 20 meters per minute. Several pull roll sets (not shown) may be included in the device of FIG. 1 for advancing said tape through the device. According to an embodiment of the method of the invention, the drawn polymer web, i.e. the oriented non-fibrous tape 33 may upon exiting drawing unit 8 be collected e.g. wound up by take-up unit 9 to form a roll of intermediate product 10.

Figure 2:
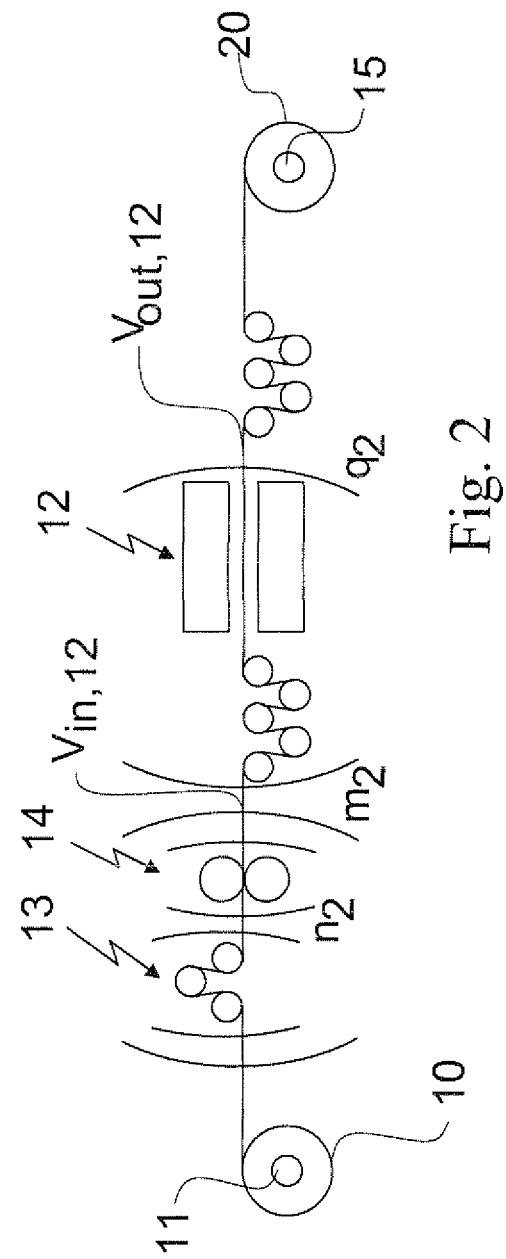
FIG. 2 is a schematic representation of a second part of a device for producing a polymer tape according to the present invention.

With reference to FIG. 2, the polymer sheet, i.e. the oriented non-fibrous tape, 33 in the form of roll 10 is then positioned onto feeding unit 11 and fed to enter a second drawing unit 12 at an ingoing line speed $V_{in,12}$ that is substantially lower than the outgoing line speed $V_{out,8}$ of drawing unit 8. In second drawing unit 12 the tape is heated to the proper temperature for drawing and then drawn an additional amount of 2 to 10, preferably of 4 to 10. Second drawing unit 12 may include heating means, several godets and hot shoe drawing units (not shown) as is known in the art, and may include line tension sensors (not shown). According to an embodiment of the method of the invention, the drawn polymer tape 34 is upon exiting the drawing unit 12 collected by take-up unit 15 to form a roll of final product 20, said final product being referred herein as a highly oriented non-fibrous tape. Such a lay-out would represent a 2 step process. Optionally a preheating unit 13 and/or a calendar station 14 may be present. In FIG. 2, n2 is an integer of at least 0, m2 is an integer of at least 0 and q2 is an integer of at least 1.

Alternatively it is also possible to have several lines according to FIG. 2 connected to each other to form a process with more steps, e.g. a 3 step process comprising one device according to FIGS. 1 and 2 devices according to FIG. 2.

Since the ingoing line speeds may be chosen lower than the outgoing line speeds of the preceding step, the length of drawing units 8 and subsequent drawing units can be considerably shorter than is known in the state of the art. This may yield a better process control, and reduces the risk for damaging the tape. A further advantage may be that the throughput of the method of the invention is improved.

The method according to the invention is discontinuous. By the term "discontinuous" is meant that the ingoing line speed of a method step differs from the outgoing line speed of an immediately preceding method step. In especially preferred embodiments of the invention the line speed difference will be present as a ratio of the greater line speed to the lesser line speed of between about 1.25 to about 20, preferably between about 1.75 to about 15, and most preferably between about 2.5 to about 10. In a more preferred embodiment, the ratio of the outgoing line speed of a method step and the ingoing line speed of an immediately preceding method step is between about 1.25 to about 20, preferably between about 1.75 to about 15, and most preferably between about 2.5 to about 10 According to certain preferred embodiments, this may mean that after any step in the method of the invention, i.e. a step being a part of the method of the invention, having at least a collecting and/or feed unit, including the press step, the outgoing line speed of a preceding method step is greater than the ingoing line speed of the immediately subsequent method step.

For example using V to denote an ingoing or outgoing line speed, one can define for a preferred embodiment of the invention and of the device of the invention that:

$$V_{in,8} < V_{out,7}, \text{ or}$$

$$V_{in,12} < V_{out,8}, \text{ or}$$

The final product 20 exiting the last drawing unit has preferably undergone a total draw ratio of at least 100, wherein the draw ratio is defined as the length after stretching (also called in the art drawing) divided by the length before stretching. At these draw ratios, a highly oriented polymer tape and in particular a highly oriented high molecular weight polymer tape is produced. The total draw ratio is a product of the individual draw ratios of each separate drawing stage.

Test methods as referred to in the present application, are as follows

Intrinsic Viscosity (IV) is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration;

Tensile properties of tape (measured at 25° C.): tensile strength (or strength), tensile modulus (or modulus) and elongation at break (or eab) are defined and determined on tapes of a width of 20 mm as specified in ASTM D882, using a nominal gauge length of the tape of 440 mm, a crosshead speed of 50 mm/min.

The melting point and heat of fusion of a polymer is determined by DSC on a power-compensation PerkinElmer DSC-7 instrument which is calibrated with indium and tin with a heating rate of 10° C./min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only.

The furnace block of the DSC-7 is cooled with water, with a temperature of 4° C. in order to provide a constant block temperature, for a stable baselines and good sample temperature stability. The temperature of the furnace block should be stable for at least one hour before the start of the first analysis. For tape measurements, the tape is cut into small square pieces of 5 mm maximum and a sample size of at least about 1 mg (+/−0.1 mg) is taken. Typically, for a tape with a thickness of 40 micron, one square piece of 5 mm is about 1 mg. For smaller thicknesses more pieces are stacked. For thicker tapes the size may be reduced, such that 1 mg sample mass is obtained at minimum.

The representative sample is put into an aluminum DSC sample pan (50 µl), which is covered with an aluminum lid (round side up) and then sealed. In the sample pan (or in the lid) a small hole must be perforated to avoid pressure build-up (leading to pan deformation and therefore a worsening of the thermal contact). For powder samples, a minimum of 1 mg (+/−0.1 mg) of powder is taken and charged into the sample pan.

The sample pan is placed in a calibrated DSC-7 instrument. In the reference furnace an empty sample pan (also covered with a pierced lid and sealed) is placed.

The following temperature program is run:
1. sample is kept for 5 min at 40° C. (stabilization period)
2. increase temperature from 40 up to 200° C. with 10° C./min. (first heating curve)
3. sample is kept for 5 min at 200° C.
4. temperature is decreased from 200 down to 40° C. (cooling curve)
5. sample is kept for 5 min at 40° C.
6. optionally increase temperature from 40 up to 200° C. with 10° C./min to obtain a second heating curve.

The same temperature program is run with an empty pan in the sample side of the DSC furnace (empty pan measurement).

Analysis of the first heating curve is used as known in the art to determine the melting temperature of the analyzed sample. The heat of fusion $\Delta H$ is obtained by integrating the peakarea, as is commonly known in the art. Furthermore the crystallinity is calculated by dividing the $\Delta H$ by 293 J/g, which is the heat of fusion of the pure crystal.

The empty pan measurement is subtracted from the sample curve to correct for baseline curvature. Correction of the slope of the sample curve is performed by aligning the baseline at the flat part before and after the peaks (at 60 and 190° C. for UHMWPE). The peak height is the distance from the baseline to the top of the peak.

The invention is now further explained by means of the following example, without being limited hereto.

EXAMPLE I

Example I was carried out by compacting polyethylene powder (UHMWPE) that is drawable in the solid state, GUR® X168 of Ticona, in a 3 step discontinuous process whereby the lay-out of FIG. 1 was used for step 1 and was followed by 2 subsequent lay-outs of FIG. 2, for steps 2 and 3 respectively.

In this case for step 1 in FIG. 1 n1=0; m1=0 and q1=1; a subsequent lay-out of FIG. 2 for step 2 whereby n2=0; m2=0 and q2=2, and an additional and final step 3 according to the lay-out of FIG. 2 for this last step 3 whereby n3=0; m3=0 and q3=2. The compacting of the UHMWE powder was done at an average pressure of 35 bars and a temperature of 140° C., $V_{IN,7}$ was 1.2 m/min. The compacted UHMWPE sheet was then drawn in a calendar at 140° C. to a draw ratio of 4. The outgoing line speed $V_{out,8}$ was therefore 14.4 m/min. Subsequently the calendared web was stretched in a first drawing oven at 152° C. with a draw ratio of 3. Since the invented method is discontinuous, the ingoing line speed of stretching step 2 $V_{in,12}$ can be chosen at will. In the present example, $V_{in,12}$ was chosen as 5 m/min, i.e. lower than the outgoing speed $V_{out,8}$. To accommodate the draw ratio of 5 in oven 12 the outgoing line speed $V_{out,12}$ was 25 m/min. Finally the (intermediate) product as produced in this second step was fed to the third and last step with process conditions equal to the conditions as used in step 2, with the exception of an ingoing speed of 6 m/min and an outgoing speed of 12 m/min. The total draw ratio of the produced tape amounts to 120 (=4×3×5×2). The total oven length required however just 50 m is. The maximum line speed of 25 m/min is also considerably lower than often reported for continuous processes being in the order of about 144 m/min. The produced drawn tape had a tenacity of 1.7 GPa and an E-modulus of 1115 GPa.

The tapes were subsequently woven into a fabric. A plurality of fabric sheets were pressed at 130° C. with a pressure of 165 bar for 80 minutes. The obtained pressed panel had an areal density of 22 kg/m². The ballistic properties of the panel were tested with a 7.62 Natoball and achieved a $V_{50}$ of about 800 m/s.

The invented method offers an improved process control and leads to tapes with at least similar properties as in the state of the art. In addition it was observed that the tapes of the invention render material sheets comprising thereof and ballistic articles comprising said material sheets with improved properties than e.g. known material sheets or articles comprising thereof.

The invention claimed is:
1. A method for producing a highly oriented non-fibrous polymer tape comprising:
   a) forming and compressing a polymer powder bed at a temperature below the melting point of the polymer to form a non-fibrous polymeric sheet;
   b) rolling and stretching the non-fibrous sheet formed according to step a) in a calendar unit at a temperature below the melting point of the polymer to form a partially oriented polymer web;

c) drawing the partially oriented polymer web in a drawing unit at a temperature below the melting point of the polymer to form an oriented non-fibrous polymer tape; and d) repeating step c) to form a more oriented non-fibrous polymer tape, wherein the method is practiced in a discontinuous manner such that an ingoing line speed of at least two of the method steps b), c) and d) are lower than an outgoing line speed of a preceding step.

2. The method of claim 1, wherein step a) is directly followed by step b), and wherein an outgoing line speed of step a) is substantially the same as an ingoing line speed of step b).

3. The method of claim 1, further comprising rolling and stretching the partially oriented polymer web of step b) to form a more fully oriented polymer web.

4. The method of claim 1, which respectively comprises:
winding the non-fibrous polymeric sheet, partially oriented polymeric web or oriented non-fibrous polymer tape onto a bobbin at a winding speed which is substantially the same as an outgoing line speed of the preceding step,
breaking the non-fibrous polymeric sheet, partially oriented polymeric web or oriented non-fibrous polymer tape after being wound onto the bobbin, and then
unwinding the non-fibrous polymeric sheet, partially oriented polymeric web or oriented non-fibrous polymer tape from the bobbin to at least one of steps b) and c), respectively, at substantially the ingoing line speed thereof.

5. The method of claim 1, wherein the polymer is selected from the group consisting of polyolefins, ultrahigh molecular weight polyolefins, polyesters, polyvinyl alcohols, polyacrylonitriles, polyamides, liquid crystalline polymers, polybenzimidazole and polybenzoxazole.

6. The method of claim 1, wherein step c) includes uniaxially drawing the partially oriented polymer web.

7. The method of claim 1, wherein a line speed ratio of a greater outgoing line speed of a preceding step to a lower ingoing line speed is between about 1.25 to about 20.

8. The method of claim 1, wherein the polymer is a high or ultrahigh molecular weight polyethylene.

9. The method of claim 7, wherein the line speed ratio is between about 1.75 to about 15.

10. The method of claim 7, wherein the line speed ratio is between about 2.5 to about 10.

11. The method of claim 1, wherein the polymer is an ultrahigh molecular weight polyethylene having an intrinsic viscosity as measured in decalin at 135° C. of at least 4 dl/g.

12. The method of claim 1, wherein the polymer is an ultrahigh molecular weight polyethylene that is drawable in a solid state.

13. The method of claim 5, wherein the polymer is poly(1,4-phenylene-2,6-benzobisoxazole) or poly(2,6-diimidazo[4,5-b-4',5'-e]pyridinylene-1,4-(2,5-dihydroxy)phenylene).

14. The method of claim 1, wherein the polymer is a high molecular weight polymer having a viscosity-average molecular weight of 250000 or more.

15. A method for producing a highly oriented non-fibrous polymer tape comprising:
a) forming and compressing a polymer powder bed at a temperature below the melting point of the polymer to form a non-fibrous polymeric sheet;

b) rolling and stretching said sheet in a calendar unit at a temperature below the melting point of the polymer to form a partially oriented polymer web;

b') winding the partially oriented polymer web onto a bobbin at a winding speed which is substantially the same as an outgoing line speed of b); breaking the partially oriented polymer web; and then unwinding the partially oriented polymer web to step c) at substantially the ingoing line speed thereof;

c) drawing the partially oriented polymer web in a drawing unit at a temperature below the melting point of the polymer to form an oriented non-fibrous polymer tape;

c') winding the oriented non-fibrous polymer tape onto a bobbin at a winding speed which is substantially the same as an outgoing line speed of c); breaking the partially oriented non-fibrous polymer tape; and then unwinding the oriented non-fibrous polymer tape to step d) at substantially the ingoing line speed thereof;

d) repeating step c) to form a more oriented non-fibrous polymer tape, wherein the ingoing line speed of method step c) is lower than the outgoing line speed of step b); and the ingoing line speed of step d) is lower than the outgoing line speed of step c).

16. The method of claim 15, further comprising step a') winding the non-fibrous polymeric sheet onto a bobbin at a winding speed which is substantially the same as an outgoing line speed of a); breaking the non-fibrous polymeric sheet; and then unwinding the non-fibrous polymeric sheet to step b) at substantially the ingoing line speed thereof.

17. The method of claim 16, wherein the ingoing line speed of step b) is lower than the outgoing line speed of step a).

18. The method of claim 15, further comprising rolling and stretching the partially oriented polymer web of step b) to form a more fully oriented polymer web.

19. The method of claim 15, wherein the polymer is selected from the group consisting of polyolefins, ultrahigh molecular weight polyolefins, polyesters, polyvinyl alcohols, polyacrylonitriles, polyamides, liquid crystalline polymers, polybenzimidazole and polybenzoxazole.

20. The method of claim 15, wherein step c) includes uniaxially drawing the partially oriented polymer web.

21. The method of claim 15, wherein a line speed ratio of a greater outgoing line speed of a preceding step to a lower ingoing line speed is between about 1.25 to about 20.

22. The method of claim 15, wherein the polymer is a high or ultrahigh molecular weight polyethylene.

23. The method of claim 21, wherein the line speed ratio is between about 1.75 to about 15.

24. The method of claim 21, wherein the line speed ratio is between about 2.5 to about 10.

25. The method of claim 15, wherein the polymer is an ultrahigh molecular weight polyethylene having an intrinsic viscosity as measured in decalin at 135° C. of at least 4 dl/g.

26. The method of claim 15, wherein the polymer is an ultrahigh molecular weight polyethylene that is drawable in a solid state.

27. The method of claim 15, wherein the polymer is poly(1,4-phenylene-2,6-benzobisoxazole) or poly(2,6-diimidazo[4,5-b-4',5',-e]pyridinylene-1,4-(2,5-dihydroxy)phenylene).

28. The method of claim 15, wherein the polymer is a high molecular weight polymer having a viscosity-average molecular weight of 250000 or more.

* * * * *